US008246266B2

(12) United States Patent
Lang et al.

(10) Patent No.: US 8,246,266 B2
(45) Date of Patent: Aug. 21, 2012

(54) LINKAGE ARRANGEMENT FOR THE ADJUSTMENT OF REARVIEW MIRRORS

(75) Inventors: Heinrich Lang, Ergersheim (DE); Wolfgang Seiboth, Bad Windsheim (DE); Stefan Centmayer, Ergersheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 1088 days.

(21) Appl. No.: 11/903,659

(22) Filed: Sep. 24, 2007

(65) Prior Publication Data

US 2008/0073477 A1 Mar. 27, 2008

Related U.S. Application Data

(63) Continuation-in-part of application No. 10/323,702, filed on Dec. 18, 2002, now abandoned.

(30) Foreign Application Priority Data

Dec. 21, 2001 (DE) .................................. 101 63 318

(51) Int. Cl.
*G02B 7/182* (2006.01)
(52) U.S. Cl. ........... 403/87; 359/874; 403/124; 403/127
(58) Field of Classification Search .................. 403/87, 403/90, 124–127, 135; 248/481–484; 359/872, 359/874, 876
See application file for complete search history.

(56) References Cited

U.S. PATENT DOCUMENTS

| 892,105 | A | * | 6/1908 | White | 248/60 |
|---|---|---|---|---|---|
| 3,425,657 | A | * | 2/1969 | Doyle | 248/481 |
| 3,434,688 | A | * | 3/1969 | Engelmann | 248/483 |
| 4,157,876 | A | * | 6/1979 | DiGiulio | 403/90 |
| 4,568,121 | A | * | 2/1986 | Kashima | 297/215.15 |
| 4,620,813 | A | * | 11/1986 | Lacher | 403/93 |
| 4,981,279 | A | * | 1/1991 | Andreas et al. | 248/483 |
| 5,621,577 | A | * | 4/1997 | Lang et al. | 359/872 |
| 5,629,810 | A | * | 5/1997 | Perry et al. | 359/872 |
| 5,806,821 | A | * | 9/1998 | Phillips et al. | 248/288.51 |
| 5,888,232 | A | * | 3/1999 | Taylor | 623/38 |
| 5,897,417 | A | * | 4/1999 | Grey | 446/125 |
| 6,234,703 | B1 | * | 5/2001 | Bieg et al. | 403/115 |
| 6,302,549 | B1 | * | 10/2001 | Branham et al. | 359/871 |
| 6,491,402 | B1 | * | 12/2002 | Stenzel | 359/871 |
| 6,948,822 | B2 | * | 9/2005 | Stenzel | 359/879 |
| 2004/0151535 | A1 | * | 8/2004 | McDevitt | 403/90 |
| 2005/0128612 | A1 | * | 6/2005 | Ro | 359/879 |
| 2006/0274443 | A1 | * | 12/2006 | Lang et al. | 359/879 |

\* cited by examiner

*Primary Examiner* — Joshua Kennedy
(74) *Attorney, Agent, or Firm* — Seann P. Lahey; McNair Law Firm P.A.

(57) ABSTRACT

A first linkage component including a ball socket having a concave profiling and a second linkage component including a projection having a convex profiling received in the concave profiling of the ball socket. A sliding plate carried between the ball socket and projection having a convex profiling conforming to the concave profiling of the ball socket and a concave profiling conforming to the convex profiling of the projection. The convex profilings of the projection and sliding plate have a larger radius of curvature than the concave profilings of the sliding plate and the ball socket. A connecting rod connects the first linkage component, the second linkage component, and the sliding plate together. Wherein the larger radius of curvature of the convex profiling of the sliding plate and projection causes the projection and sliding plate to be further received in the ball socket after abrasive wear to prevent play between components.

14 Claims, 6 Drawing Sheets

LINKAGE ARRANGEMENT FOR THE ADJUSTMENT OF REARVIEW MIRRORS

CROSS-REFERENCE TO RELATED APPLICATION

This application is a continuation-in-part of U.S. application Ser. No. 10/323,702, filed Dec. 18, 2002 now abandoned and claims foreign priority of Dec. 21, 2001.

FIELD OF THE INVENTION

The invention concerns a linkage arrangement especially for the adjustment of rearview mirrors for motor vehicles.

BACKGROUND OF THE INVENTION

EP 95 90 510 B1 or EP 06 54 377 A2 discloses an adjustable rearview mirror in which the mirror pane is connected via a linkage with a carrier plate. The linkage connection includes a ball socket, which is connected to the carrier plate. Into the ball socket is fitted a hemispherical, shall-shaped projection on which the mirror pane is fastened. By a clamping connection, the hemispherical shaped projection is pressed into the ball socket so that when pivoted, the linkage remains stationary in an optional direction. This ability to pivot in a desired direction also results in relatively large play. Because of this large play, the precision of the mirror adjustment is limited.

DE 196 44 834 C1 discloses a ball socket and a projection similar to the foregoing between which a plastic disk is provided with a first web on the outside and a second web perpendicular to the first on the inside. The two webs engage themselves in complementary shaped openings in the ball socket and in the projection pertaining thereto. By this structure of the ball socket, the plastic disk, and the projection, the guidance of the mirror adjustment is limited to two axes of rotation, disposed at right angles to one another. In any case, this construction has a tendency toward great play when exposed to abrasion and wear.

BRIEF SUMMARY OF THE INVENTION

The present invention provides a linkage arrangement in which the play remains small after adjustments over extended periods. It is a further purpose of the present invention to provide a rearview mirror with such a linkage connection. The component parts of the invention are simple, reliable, and economical to manufacture, assemble and use. Other advantages of the invention will be apparent from the following description and the attached drawings, or can be learned through practice of the invention.

Because of the fact that an outer, concave shape is more sharply curved than an inner, convex shape, the surfaces of the cupped shapes, when the inner is placed within the outer, do not lie completely contiguous to one another. Moreover, at what should be the deepest point of contact between the concave and convex shapes, the surfaces do not touch at all. If wear occurs, the inner convex structure penetrates deeper into the outer concave structure to prevent increased play. The convex and concave structures form, respectively, a ball-and-socket joint.

Surface profiling is provided on the ball-and-socket assembly and the sliding part connected therewith. The profiling, when seen in top view, comprises straight-line corrugations following the surfaces. By this surface profiling of the ball-and-socket and associated parts, two axes of rotation are defined, fixed in space, and oriented at an angle to one another, thus establishing planes of rotation. Accordingly, the desired adjustment or pivoting capability is established. Simultaneously, loadings by forces not in the current planes of rotation, are distributed over the plurality of the elevations of the profiling and are thus less effective. Additionally, the guidance into the current plane of rotation is improved by the corrugation-like profiling and play is further diminished.

In accord with an alternative embodiment of the invention where a multiplicity of grooves and elevations are present as part of the profiling, the improved freedom from play occurs without a difference in radii of curvature via the full surface contact of the grooves and elevations.

In accord with an advantageous embodiment of the invention, the two fixed axes of rotation stand perpendicular to one another, whereby the necessary paths of adjustment are minimized.

In accord with yet another advantageous embodiment, a sliding piece is hemispherical in shape, and thus its concavity fits with the shape of the ball projection. In other words, the sliding piece is complementary to the projection, the transmission of force between the two linkage components is evenly distributed.

In accord with another advantageous embodiment, the profiling covers the full surface of the inner side of the ball socket and also covers that side of the projection as well as the forward and rear sides of the sliding piece. In this way the surface, which has been profiled in accord with the invention, is maximized and the distribution of the forces made uniform.

Because of the wave form shaping of the profiling, the distribution of the forces is likewise evened out and peaks of force are avoided.

Because of the fact that the sliding piece is made of a vibration damping material, the vibration tendency of a rearview mirror is reduced with an invented linkage connection.

Another advantageous embodiment of the invention induces a projection rod that penetrates central openings in the ball joint, sliding piece and projection, which results in a compact connection arrangement between the two linkage components.

The sliding piece, in an advantageous manner, can be placed between the projection and the ball socket on the convex underside of the ball joint, or on the concave topside of the projection. In this way, the size of the central openings, in a simple way, determines the pivoting range of the linkage apparatus.

A linkage apparatus of this kind is especially appropriate for adjustable rearview mirrors. In this case, the adjustable mirror pane is connected with the mirror carrier via the invented linkage apparatus.

BRIEF DESCRIPTION OF THE DRAWINGS

The above and other aspects and advantages of the present invention are apparent from the detailed description below in combination with the drawings in which.

DESCRIPTION OF A PREFERRED EMBODIMENT

Figure 1:
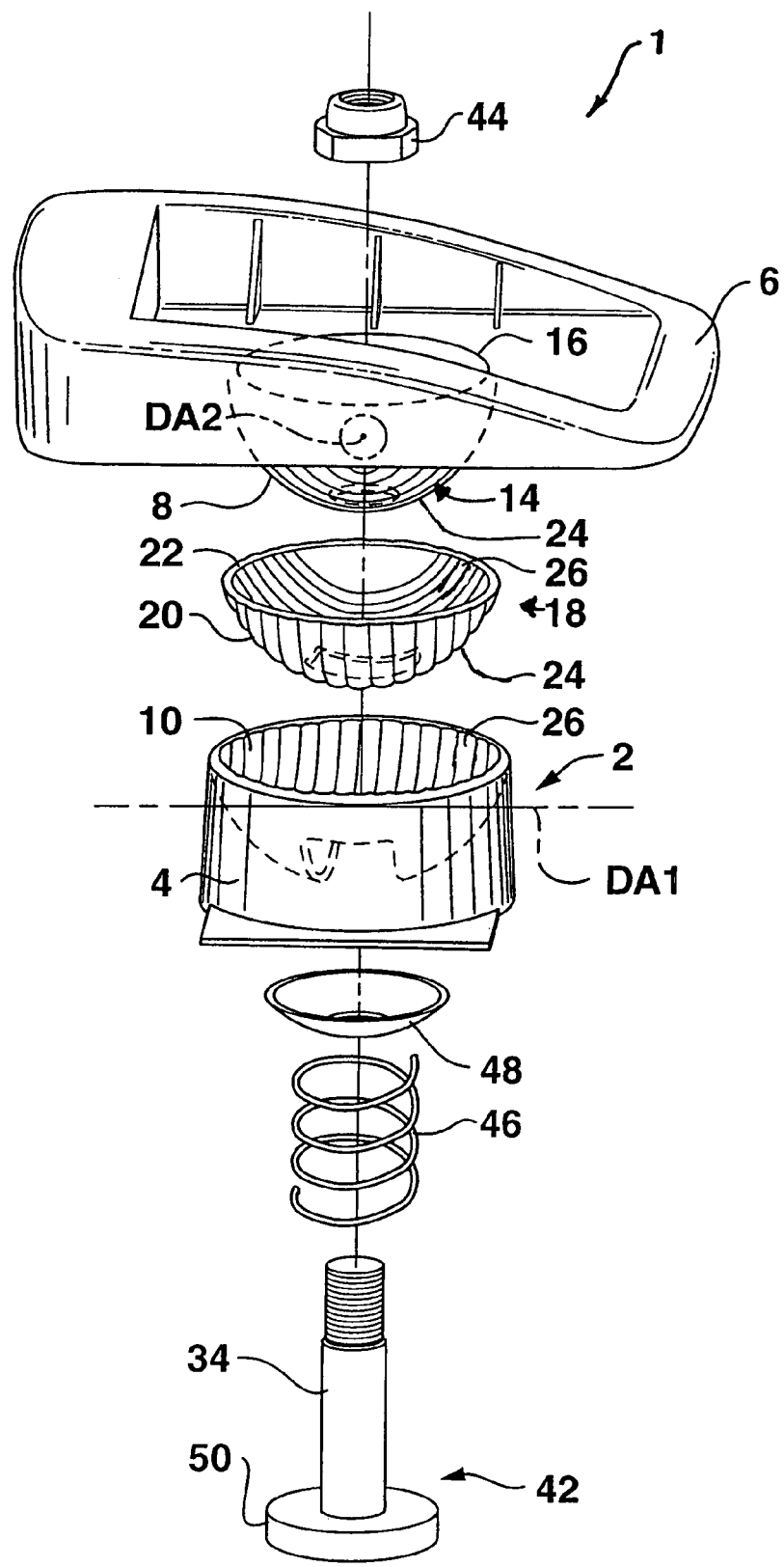
FIG. 1 is a perspective, exploded view of a first embodiment of the invention.

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar elements of the invention.

Figure 2:
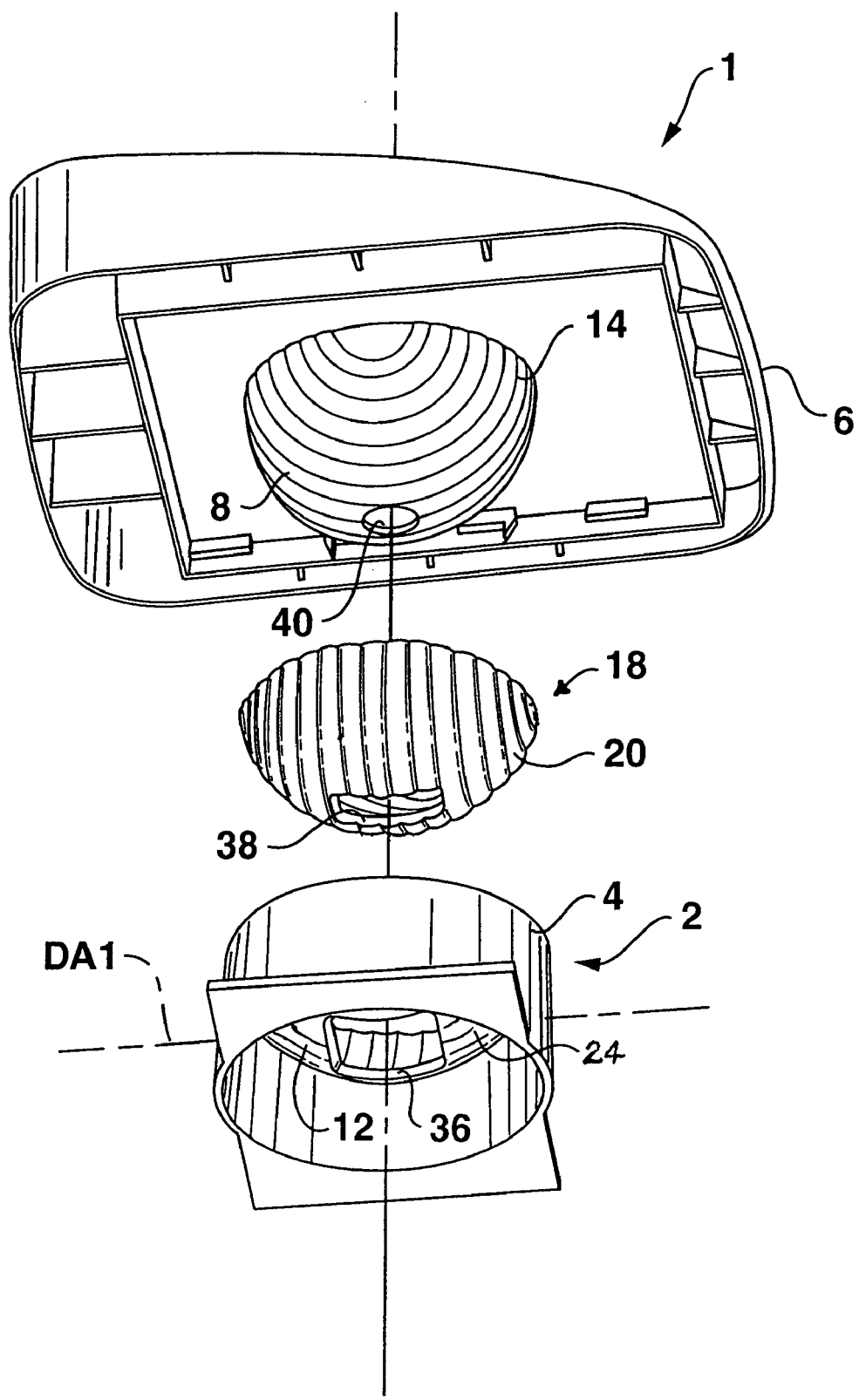
FIG. 2 is a perspective, exploded view of the first embodiment of the invention as in FIG. 1 seen from another angel.
Figure 3:
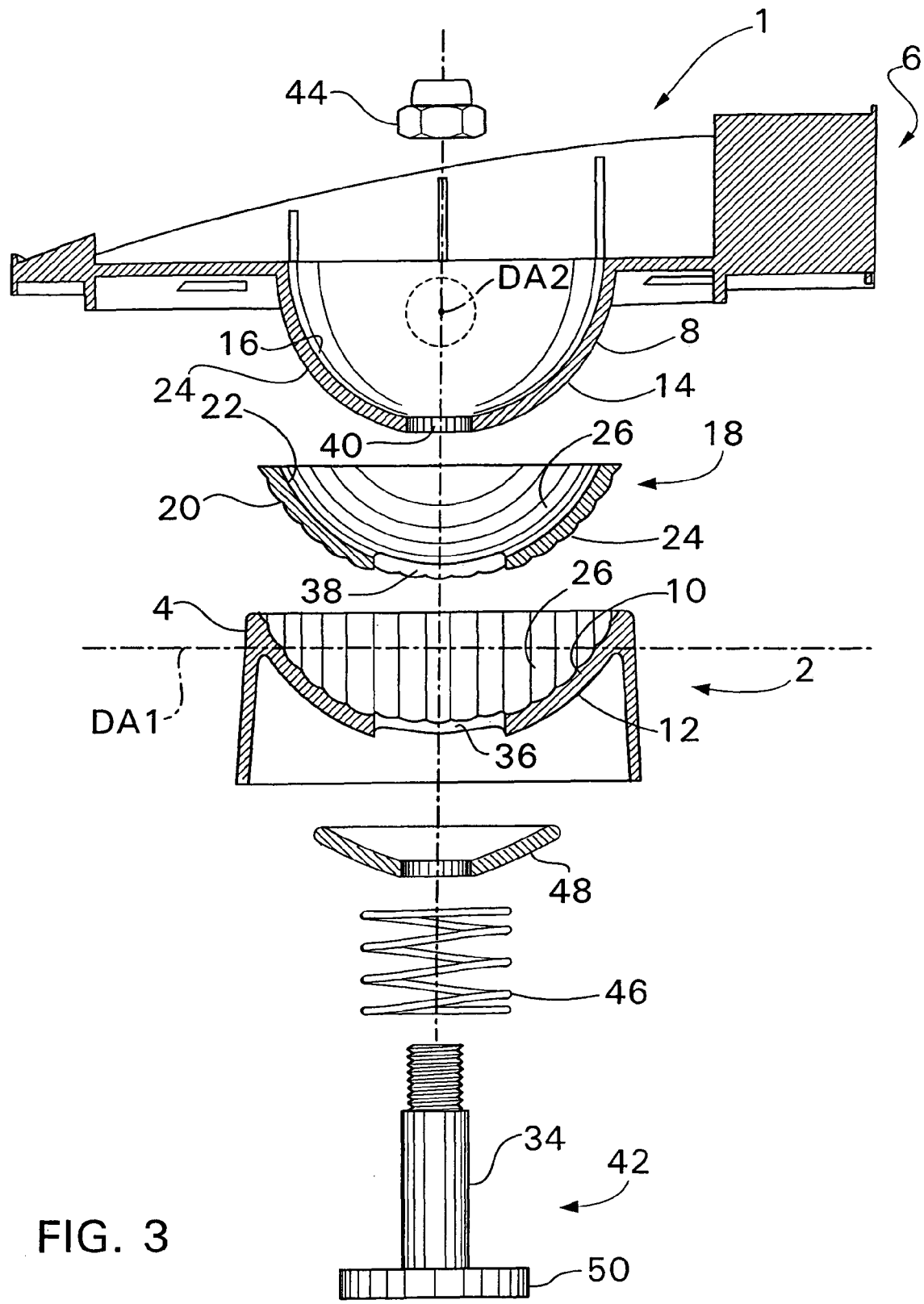
FIG. 3 is a sectional view of the embodiment as in FIGS. 1 and 2.

FIGS. 1, 2 and 3 show a first embodiment of a linkage apparatus 1 in an exploded view. The linkage apparatus 1 encompasses a first linkage component 2 with a ball socket 4 and a second linkage component 6 with a hemispherically shaped projection 8. The ball socket 4 is likewise of hemispherical shape with a concave topside 10 and a convex underside 12. The hemispherically shaped projection 8 has a convex underside and a concave topside 16. The projection 8 fits into the ball socket 4. Between the ball socket 4 and the projection 8 is provided a hemispherical, shell-shaped sliding piece 18 that has a convex underside 20 and concave topside 22.

The convex underside 20 of the sliding piece 18 is provided with a convex profiling 24, and the concave topside 10 of the ball socket 4 is provided with a concave profiling 26. The convex and the concave profiling 24 and 26 are molded to be complementary to one another and partially fit together after insertion in a form-fit manner. In this way, between the first linkage part 2 and the sliding piece 18, a sliding movement is only possible about a first axis of rotation DA1 co-extensive of profilings 24, 26, carried by these members. FIGS. 1, 2 and 3 show that the first axis DA1 extends across a horizontal plane of the drawings.

The mutually concave topside 22 of the sliding piece 18 is likewise provided with the concave profiling 26 and the convex underside 14 of the projection 8 is provided with convex profiling 24, complementary to the concave profilings 26. In this way, between the sliding piece 18 and the second linkage component 6, only one sliding direction of movement is possible about a second axis of rotation DA2, which is perpendicular to the first axis of rotation DA1; and is also perpendicular to the horizontal plane of the drawings.

The mutually complementary profilings 24 and 26 consist of a plurality of running ridges or elevations and valleys or grooves, which appear in a top view to be straight lines. Viewed in a plane transverse to an axis of rotation DA1 or DA2 as in FIG. 3, the wave-like, cross-sections of the elevations and grooves are visible. More specifically, FIG. 3 shows the convex profiling 24 on the convex underside 20 of the sliding part 18 and the concave profiling 26 on the concave topside 10 of the ball socket 4.

Figure 4:
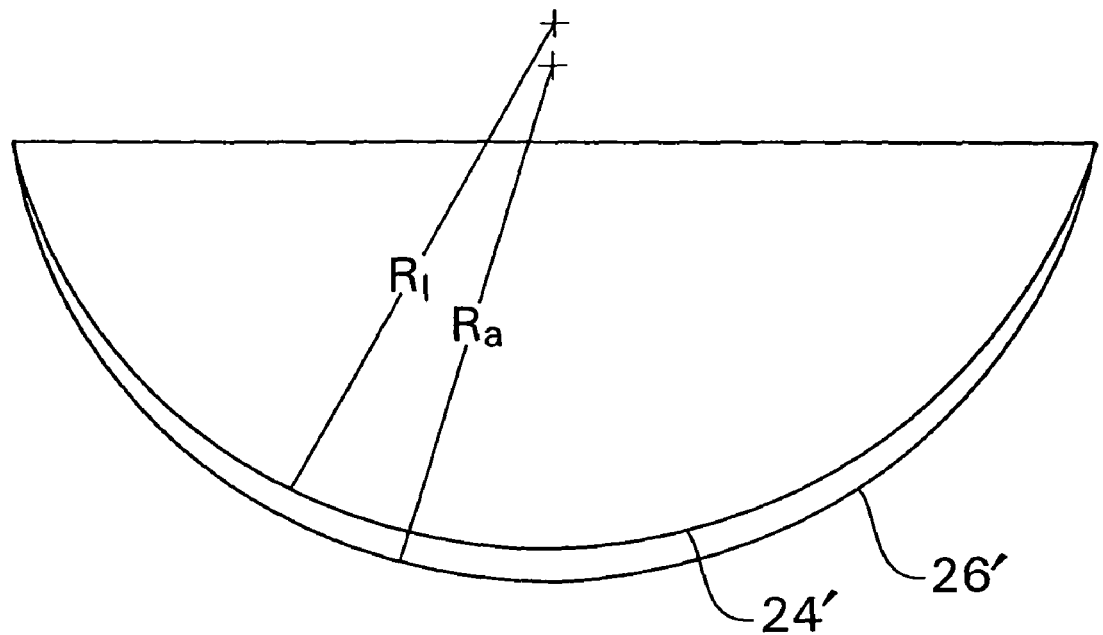
FIG. 4 is a schematic drawing of the differences in varied curvatures of convex and concave structuring.

The respective convex and concave profiling forms on these components, are made in a half shell form as seen in FIG. 4. In this case, the outer concave profiling here identified as 26' has a sharper curve or a slightly smaller radius than the inner convex profiling form here identified as 24'. In other words, the profiling along radius R1 of the inner profilings form 24' is larger than the radius Ra of the outer profiling form 26'. If the profiling forms 24' and 26' were rigid, then the complementary groove/elevation corrugations would engage each other only along one circumferential line. Since, however, the forms 24' and 26' may be plastically deformable, which allows the engagement to be along a closed contact strip surface. Accordingly, this plastic arrangement of the inner profiling form 24' of greater radius, and the outer profiling form 26' of less radius allows the profiling forms 24', 26' to slide or move into one another after abrasive wear. Thus, over a long service life, increased play is prevented.

Alternatively, the profiling forms 24' and 26', which are complementary to one another, can be made to fit one another in such a way that the full surfaces are engaged, as indicated in the drawings of FIGS. 1, 2 and 4 to 6.

In this aspect of the invention, the first and second linkage components 2 and 6, along with the sliding piece 18, are clamped together by a connection apparatus 42.

The connection apparatus 42 is comprised of a threaded connecting rod or bolt 34, which penetrates a first, second and third central opening, respectively 36, 38 and 40, in the ball socket, the sliding piece 18 and the projection 8. The threaded connecting rod 34 possess at its lower end a support assembly or head 50 and on its upper end a threaded abutment head. The upper threaded head, as shown in FIGS. 1, 2, 3 and 5, connects with the threaded nut 44 which bears upon the concave topside 16 of the projection 8. The lower connection apparatus 42 encompasses a helical spring 46, a pressure disk 48, a threaded rod or bolt 34 and support assembly or head 50. The pressure disk 48 and the helical spring 46 are slipped over the connection rod 34 which extends through the first, second and third central opening 36, 38 and 40 in the ball socket 4, sliding piece 18 and projection 8 and is fixed in place by nut 44 and head 50. In the arrangement shown in FIG. 6, the rod 34 is inserted, again first, through pressure disk 48 and secured as described.

The third central opening 40 in the projection 8 adapts in its diameter to the diameter of the connecting rod 34. The second central opening 38 in the sliding piece 18 is a slot, the greater diameter of which extends in the direction of rotation about the second axis of rotation DA1. The first central opening 36 in the ball socket 4 is also a slot, the greater diameter of which extends itself in the direction of rotation about the first axis of rotation, namely DA1.

It is noted that all convex profilings 24 as formed on first component 1, second component 6 and sliding piece 18 are all substantially the same size and configuration. Also, all concave profilings 26, as formed on each member 1, 6 and 18, are all substantially of the same size and configuration. Therefore, all profilings 24 are complementary to all profilings 26 and partially fit together after insertion in a form fit manner as described above. This allows for the re-arrangement of components as shown in FIGS. 5 and 6 and hereinafter described.

Figure 5:
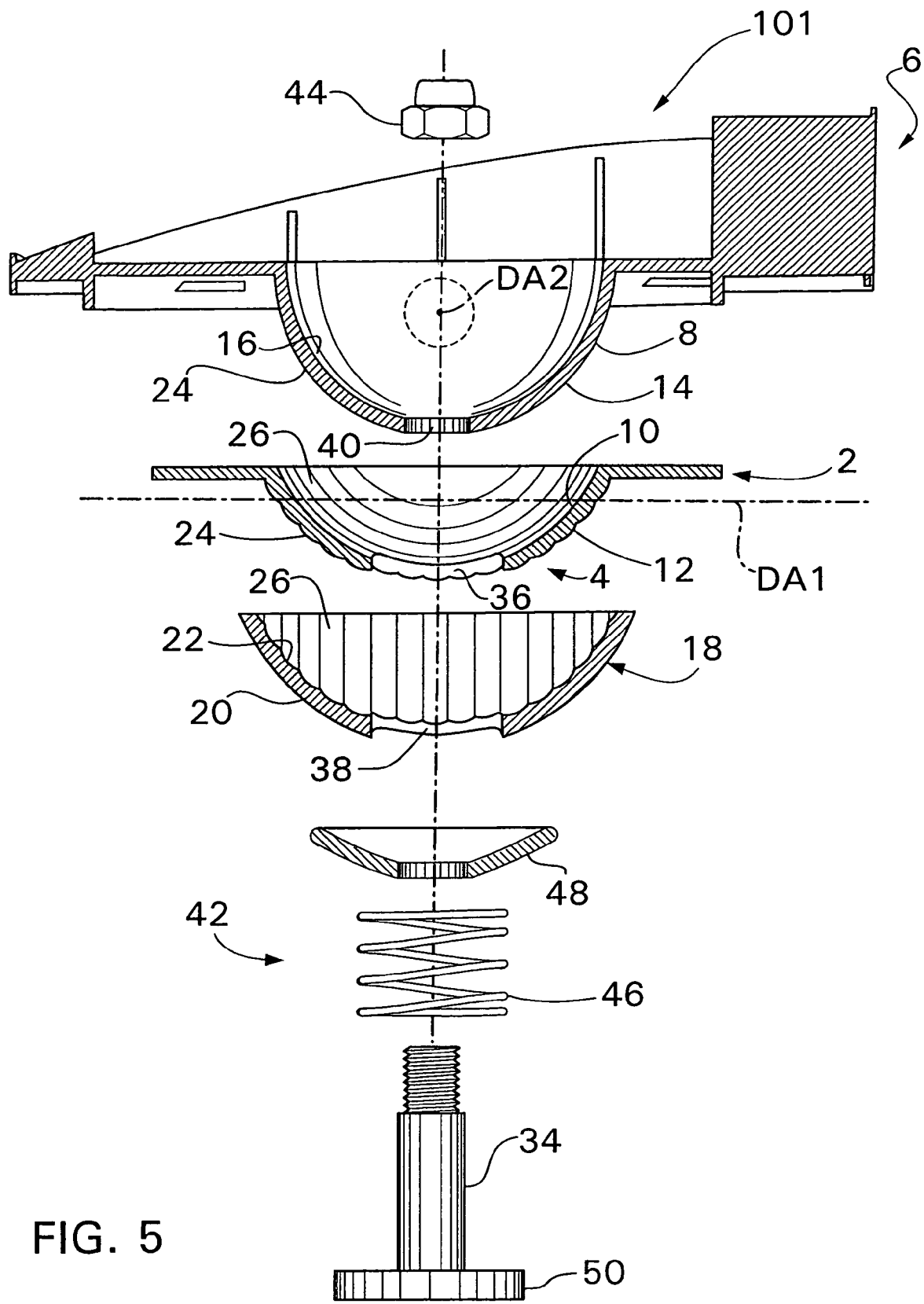
FIG. 5 is a second embodiment of the invention.
Figure 6:
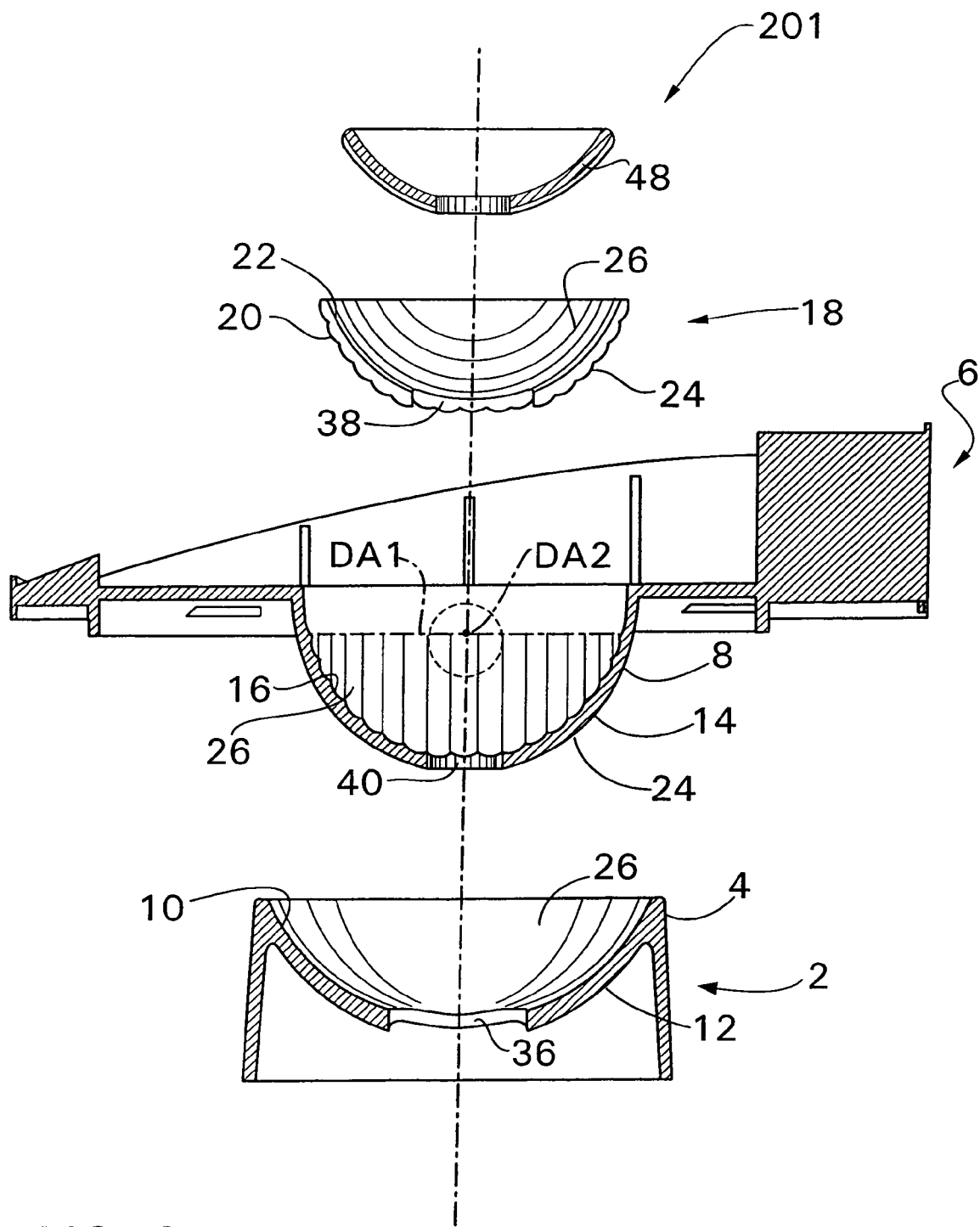
FIG. 6 is a third embodiment of the invention.

FIG. 5 shows schematically, in a presentation similar to FIG. 3, a second embodiment of a linkage apparatus 101. This second embodiment of the invention differentiates itself from the first embodiment in that the ball socket 4 of the first component 2 is placed between the projection 8 and the sliding piece 18. In this embodiment, profilings 24, 26 of first component 2 and sliding piece 18 are rotated by 90°.

The second linkage component 6 with projection 8, concave topside 16, convex underside 14 with convex profiling 24 corresponds to the second linkage component 6 of the first embodiment in accord with the FIGS. 1 to 3. The concave profiling 26, is complementary to the convex profiling 24 on the convex underside 14. This differs from the first embodiment in that concave profiling 26 on the concave topside 10 of the ball socket 4 is now engaged with the convex profiling 24 of projection 8. In this way, the second axis of rotation DA2 between the projection 8 and the ball socket 4 is here fixed by the complementary convex and concave profilings 24 and 26.

On the convex underside 12 of the ball socket 4, the convex profiling 24 is engaged with the concave profiling 26 on the concave topside 22 of the sliding piece 18. It is noted that first component 2 and sliding piece 18 are here rotated 90° in order for profilings 24 and 26 to be properly aligned between members 2, 6 and 18. In this way, the first axis of rotation DA1 is determined by the complementary profiling 24 and 26, respectively on the convex underside 12 of the ball socket and on the concave topside 22 of the sliding piece 18.

The connection apparatus 42 corresponds to that of the first embodiment. In this first embodiment case, the sliding piece 18 is under pressure by the pressure disk 48 lying against the underside 12 of the ball socket 4.

The third central opening 40 in the projection 8 and the second central opening 38 in the sliding piece 18 correspond in diameter to the diameter of the connecting rod 34. The first central opening 36 in the ball socket 4 is likewise round, but essentially larger and defines the pivoting range between the two linkage components 2 and 6.

FIG. 6 shows a third embodiment of a linkage apparatus 201, which differentiates itself from the first and second embodiments in that the projection 8 is placed between the sliding piece 18 and the ball socket 4. The connection apparatus 42, for the sake of simplicity, is not shown in FIG. 6.

The first axis of rotation DA1 is determined between sliding piece 18 and projection 8 by the convex profiling 24 on the convex underside 20 of the sliding piece 18 and also the complementary concave profiling 26 on the concave topside 16 of the projection 8. The second axis of rotation DA2 is determined at a line between the projection 8 and the ball socket 4 and by the convex profiling 24 on the convex underside 14 of the projection 8 and the complementary concave profiling 26 on the concave topside 10 of the ball socket 4. In this arrangement, the profilings 24 and 26 of first component 2 are re-directed by 90°.

The third central opening 40 in the projection 8 corresponds in its diameter to the diameter of the connecting rod (not shown). The first central opening 36 in the ball socket 4 and the second central opening 38 in the sliding piece 18 are essentially made larger in diameter and, once again, limit the pivoting range between the two linkage components 2 and 6.

It will be apparent to those skilled in the art that various modifications and variations can be made in the present invention without departing from the scope and spirit of the invention. For example, specific shapes of various elements of the illustrated embodiments may be altered to suit particular applications. It is intended that the present invention include such modification and variations as come within the scope of the appended claims and their equivalents.

What is claimed is:

1. A linkage arrangement for a rearview mirror comprising:
   a first linkage component having a ball socket having a concave surface including a plurality of first profilings which are one of concave and convex and have a longitudinal axis;
   a second linkage component having a convex projection including a plurality of second profilings which are one of convex and concave and have a longitudinal axis;
   a sliding plate carried between said ball socket and said projection having a plurality of third profilings which are one of convex and concave and are configured to be received in said first profilings of said ball socket and a plurality of fourth profilings which are one of concave and convex and are configured to be received in said second profilings of said projection;
   said second profilings of said projection and said third profilings said sliding plate having a larger radius of curvature than said fourth profilings of said sliding plate and said first profilings of said ball socket; and,
   a connecting rod connecting said first linkage component, said second linkage component, and said sliding plate together; wherein,
   said larger radius of curvature of said second and third profilings of said sliding plate and said projection allows said second and third profilings to be fully received in said first and fourth profilings of said ball socket and said sliding plate only after abrasive wear, thereby extending the life of said linkage by continuing to prevent play between the components.

2. The linkage arrangement as in claim 1, wherein the profilings of said ball socket, said second linkage and said sliding plate each define one of a plurality of parallel grooves and elevations, said plurality of grooves being adapted for receiving said plurality of elevations.

3. The linkage arrangement of claim 2, wherein said grooves and elevations of the respective profilings define a substantially uniform waveform.

4. The linkage arrangement of claim 1, wherein the profilings of said ball socket cooperate with the profilings of said sliding plate to define a first axis of rotation, and said profilings of said projection cooperate with said profilings of said sliding plate to define a second axis of rotation moving perpendicular to said first axis of rotation.

5. The linkage arrangement of claim 4, wherein the projection, the sliding plate and the ball socket each include an opening for receiving said connecting rod to connect the ball socket, the sliding plate, and the projection together.

6. The linkage arrangement of claim 5, wherein one of the openings is configured to extend along said first axis of rotation and a second of said openings is configured to extend along said second axis of rotation to permit selective pivoting of the linkage components.

7. The linkage arrangement of claim 1, wherein the sliding plate is generally hemispherical in shape and includes both concave and convex profilings.

8. A linkage arrangement for a rearview mirror comprising:
   a first linkage member defining a first hemispherical component having at least one inner concave surface having a plurality of parallel concave profilings along a first plane;
   a second linkage member defining a second hemispherical component having an outer convex surface having a plurality of parallel convex profilings along a second plane;
   a third linkage member defining a third hemispherical member having an outer convex surface and an inner concave surface, said outer convex surface having a plurality of parallel convex profilings along said first plane and said inner concave surface having a plurality of parallel concave profilings along said second plane;
   a connection assembly configured to clamp said first, second and third linkage members together with the concave profilings of said first linkage member engaged in said convex profilings of said third linkage member and said convex profilings of said second linkage member engaged in said concave profilings of said third linkage member, said engagement of said connection assembly and said profilings limiting movement between said linkage members to be along the respective planes defined by the engaged concave and convex profilings.

9. The linkage arrangement of claim 8 wherein said convex profilings have a larger radius of curvature than said concave profilings allowing said convex profilings to be fully seated in said concave profilings only after abrasive wear, thereby extending life of said linkage.

10. The linkage arrangement of claim 8, wherein said convex profilings have a larger radius of curvature than said concave profilings and said concave and convex profilings are plastically deformable allowing engagement along a closed contact strip surface, thereby extending life of said linkage.

11. The linkage arrangement of claim 8, wherein the connection assembly includes a helical spring.

12. The linkage arrangement of claim 8, further including a pressure disk, the pressure disk and the connection assembly configured to position the third linkage member in engagement with said first and second linkage members.

13. The linkage arrangement of claim 8, wherein said plurality of convex profilings and said plurality of concave profilings respectively have substantially uniform height and depth to define a uniform waveform.

14. The linkage arrangement of claim 8, wherein the first, second and third linkage members each define an opening and the connection assembly includes a rod inserted through said openings connecting said first, second and third linkage members together.

* * * * *